United States Patent [19]
de Cortanze

[11] Patent Number: 4,653,604
[45] Date of Patent: Mar. 31, 1987

[54] SUSPENSION AND OR SHOCK-ABSORBING DEVICE FOR A SUPPORT ARM OF A VEHICLE WHEEL

[75] Inventor: André de Cortanze, St Cloud, France

[73] Assignee: Elf France, Paris, France

[21] Appl. No.: 742,745

[22] Filed: Jun. 10, 1985

[30] Foreign Application Priority Data

Jun. 8, 1984 [FR] France ................. 84 09038

[51] Int. Cl.$^4$ .................. B60G 3/18; B60G 13/00
[52] U.S. Cl. .................. 180/227; 188/272; 267/15 R; 280/284; 280/703
[58] Field of Search ........... 180/227, 219; 280/284, 280/285, 288, 283, 703, 695, 700; 267/15 R, 57; 188/272, 2 A

[56] References Cited

U.S. PATENT DOCUMENTS

| 4,076,271 | 2/1978 | Doncque ................. 180/227 X |
| 4,348,016 | 9/1982 | Milly ................... 280/284 X |
| 4,360,214 | 11/1982 | Isono ................... 280/284 |
| 4,408,674 | 10/1983 | Boyesen ................. 180/227 |
| 4,418,800 | 12/1983 | Hess .................... 180/227 X |
| 4,457,393 | 7/1984 | Tamaki et al. ........... 280/284 X |
| 4,506,755 | 3/1985 | Tsuchida et al. ......... 180/227 |
| 4,515,236 | 5/1985 | Kanamori ................ 180/227 |

FOREIGN PATENT DOCUMENTS 2102749  2/1983  United Kingdom ........... 180/227

Primary Examiner—John J. Love
Assistant Examiner—Mitchell J. Hill
Attorney, Agent, or Firm—Burgess, Ryan & Wayne

[57] ABSTRACT

Suspension and/or shock-absorber device of a rotary support arm of a vehicle wheel such as the rear wheel of a motorcycle, comprising disposed on one side of the support arm, a three arms lever mounted rotary-wise on a lever axle integral with the chassis of the vehicle and a short arm of which is connected in rotation to the body of a suspension and/or shock-absorber block with rods which are movable in translation, the device being applicable to a suspension utilizing a shock-absorbing spring block disposed underneath the engine block.

7 Claims, 1 Drawing Figure

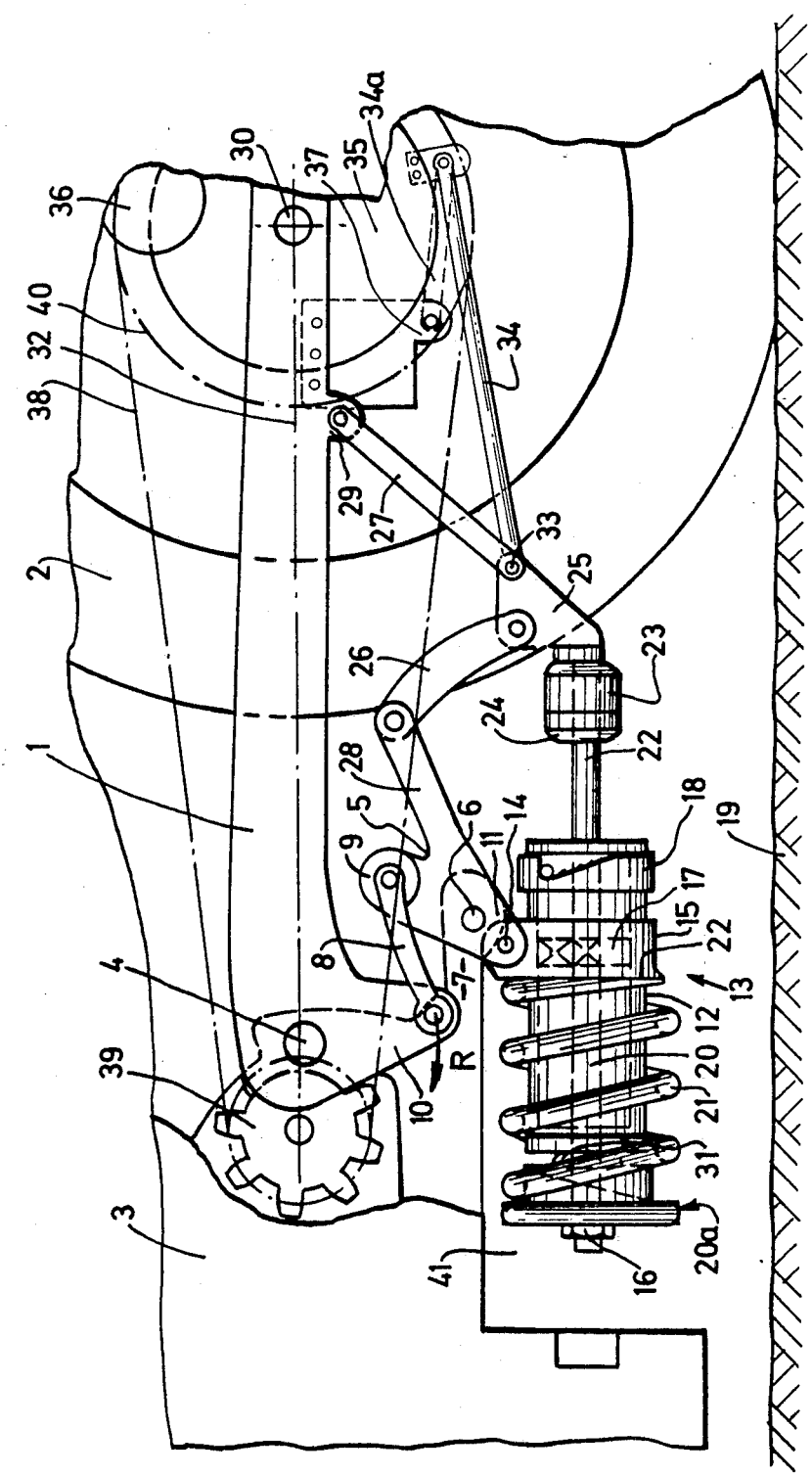

SUSPENSION AND OR SHOCK-ABSORBING DEVICE FOR A SUPPORT ARM OF A VEHICLE WHEEL

FIELD OF THE INVENTION

The present invention concerns a suspension and/or shock-absorbing device of a rotary support arm of a wheel of a vehicle, such as the rear wheel of a motorcycle, the said support arm being intended to be rotated alternatly around a connecting axle integral with the chassis or the body of the vehicle in order to cooperate with at least one suspension and/or shock-absorbing member such as a spring and/or a shock-absorber.

BACKGROUND OF THE INVENTION

The suspension of vehicles by means of rotary support arms of suspension of each of the wheels is well known in the prior art and has given rise to numerous applications in the field of automobile vehicle suspension where the rotary arm is advantageously rendered integral in rotation with one of the ends of a torsion arm the other end of which is secured to the vehicle chassis. These compact and practical dispositions are unfortunately not applicable to motorcycle which are not sufficiently wide to transversally house a torsion arm spring.

In the field of motor-cycles, is generally utilized as suspension spring a helical spring incorporated around a hydraulic shock-absorbing jack, the shock-absorbing qualities of which can be rapidly adjusted through the intermediary of cogs or screws. In order to allow the adjustment of these spring-shock-absorbing devices, it is necessary to have good manual accessibility to said device, so as to be able to act upon it with adjusting and screwing tools. It has already been proposed to do this through hinging one end of the shock-absorber underneath the motorcycle engine between the engine and the rolling path in order to prevent the shock-absorber from being inserted into suspension rods and arms.

Successive amplication push-rod systems are, furthermore, utilized with this shock-absorbing disposition underneath the engine in order to obtain stretching of the shock-absorber on the rebounce, i.e. expansion of the suspension and to provide that, for an equivalent angle of rotation of the support arm, the stroke of the actuating rod of the shock-absorber spring is variable as a function of the compression of the suspension in order to cause to vary the stiffness of the suspension and/or of the shock-absorber in function of the compression of the suspension. This stiffness generally increases with the compression of the suspension until the suspension is abutting on elastomeric stroke-end stops which thus increases the stiffness of the suspension in a very sudden manner without completely suppressing the resilience of the suspension.

One of the aims of the present invention is specifically to overcome the defects and shortcomings observed in service on rotary arm suspension devices utilizing a spring-shock-absorber assembly intended to be housed in an area offering good adjustment accessibility underneath the engine. The invention aims at allowing the introduction of the spring-shock-absorbing device in a free zone located underneath the engine while connecting it to the support arm by hinges located on the side of the engine block and thus less exposed to projections from the road than the lower part of the engine.

SUMMARY OF THE INVENTION

With this purpose, according to the invention, the suspension and/or shock-absorbing device comprises, disposed on a side of the support arm, a three arm lever lever mounted rotary-wise on a lever axle substantially parallel to the connecting axle and integral with the vehicle chassis and a medium arm thereto is hinged through the intermediary of a short push-rod to an extension of the support arm close to the connecting hinge with the chassis, while a second short arm, substantially opposite the medium arm with respect to the articulation of the three-arm lever on the chassis is rotatably connected to the body of a suspension and/or shock-absorber block having a movable rod in translation and whereas a third long arm of the said three-arm lever directed towards the wheel of the vehicle is hinged to one of the ends of a medium push-rod the other end of which is hinged to the movable rod of the suspension and/or shock-absorber block, itself hinged to one of the ends of a long push-rod the other end of which is hinged to the support arm of the side of the wheel so as to have a scissors hanging of the suspension and/or shock-absorber block between, on the one hand, the second short arm of the three-arm lever and, on the other hand, the hinging of its movable rod to the medium and long push-rods.

According to another embodiment of the suspension part of the device, the movable rod in translation of the suspension and/or shock-absorber block is integral with a flange that rests upon the end of at least one helical suspension spring mounted in compression so that its other end abuts upon the body of the suspension block.

In order to reduce the dynamic bulkiness of the suspension and/or shock-absorber block during displacement of the suspension, on the one hand, the arms length of the three-arm lever as well as the position of the lever axle with respect to the connecting axle and, on the other hand, the length of the short, medium and long push-rods, as well as the position of their hinging axles, are selected to that the movable rod of the suspension and/or shock-absorber block remains substantially parallel, either to the rolling surface of the wheel during suspension displacement of the support arm, or to the general axle of the rotary support arm.

When the suspension and/or shock-absorbing device according to the invention is applied to a vehicle such as a motorcycle comprising an engine transmission block of the vehicle, the suspension and/or shock-absorbing body is principally housed underneath the engine-transmission block on which is hinged the three-arm lever the short arm of which is connected to the suspension and/or shock-absorbing body in the vicinity of the outlet of this body beyond the vertical projection of the engine-transmission block.

In a variant, the medium push-rod and the long push-rod are hinged together to the movable rod of the suspension and/or shock-absorber body through the intermediary of a common hinging axis or a connecting piece that is integral or rendered integral with the movable rod. The connecting piece can be hinged to one end of a brake rod the other end of which is hinged to a brake caliper braket receiving the brake reaction torque of the wheel and intended to turn angularly around the axle of the wheel under the displacement effect of the connecting piece.

In the position of maximal extension of the movable rod with respect to the suspension and/or shock-absorber body, the long push-rod is preferably inclined at an angle of essentially 45° with respect to the general axle of the support arm.

BRIEF DESCRIPTION OF THE DRAWING

Other aims, advantages and objects of the invention will become apparent from reading the following description of an embodiment of the invention, given by way of non-limitative illustration with reference to the appended drawing in which the single FIGURE represents, as a side view with torn away portions, the support arm of the rear wheel of a motorcycle and its connection, according to the invention, to the engine block and to a shock absorbing and spring device.

DETAILED DESCRIPTION OF A PREFERRED EMBODIMENT

Support arm 1 of rear wheel 2 of the motorcycle is connected to engine-transmission block 3 of the motorcycle through the intermediary of a connecting axle 4.

In order to obtain the suspension of arm 1, this arm is, furthermore, connected to block 3 through the intermediary of a three-arm lever 5 mounted rotary-wise on an axis (or lever axle) 6 of a projecting nose 7 of block 3. The connection between lever 5 and support arm 1 is achieved by means of a short push-rod 8 hinged respectively, to one of the average length arms or "medium arm" 9 of the three-arm lever 5 and, at the other end, to an extension 10 of support arm 1 forming the lever amplifying the forces for this said arm.

According to the invention, short arm 11 of the lever 5 carries body 12 of a suspension and shock-absorber block (or spring suspension and damper unit) through the intermediary of a hinge axis 14 through-crossing a protruding lug of a support belt 15 of body 12. In the version represented, applied to the rear wheel of a motorcycle, block 13 is adjustable, with respect to the suspension preloading by means of a screw 16 and, with respect to the hydraulic damping characteristics of an internal piston 17, by at least one rotary sleeve 18 easily accessible between engine block 3 and rolling path 19 of the motorcycle. Block 13 comprises an oil throttling shock-absorber the piston 17 of which is connected on each face to a piston rod. On the left-hand side of the piston 17 (with respect to the FIGURE), the spring piston rod 20 is connected to a bearing flange 20a of a helical suspension spring 21 that abuts through its other end on an annular face 122 of support belt 15.

To the right of shock-absorber piston 17, piston rod 22 projects horizontally towards the outside in the form of a movable rod in translation at the end of which is screwed a hinge connection 23 that carries a shock-absorbing stop ring 24 and a hinge plate (connecting piece) 25 articulated respectively, at the end of a medium push-rod 26 and at the end of a long push-rod 27. Medium push-rod 26 is hinged to its other end with long arm 28 of lever 5. Long push-rod 27 is hinged at its other end to a fixation lug 29 of arm 1 located on the side of axle 30 of wheel 2 so that, when the suspension is in shock position, such as represented in the figure, i.e. with suspension spring 21 in its maximal compressed state (the elastomeric abutment 31 of bearing flange 20a bearing on the end of the shock-absorber body 12), it is substantially inclined at 45° with respect to the general alignment axis 32 of support arm 1, itself substantially parallel to rolling path 19.

Hinge plate 25 can, furthermore, be connected by any known hinging means, such as an axle of articulation 33 of long push-rod 27, to a retaining rod 34 of the braking moment applied to a bracket plate 35 of a disk-brake calliper 36 intended to turn by a limited angle around axle 30 of wheel 2. The rod 34 can be suppressed and replaced by conventional brake calliper short rod 34a represented in broken lines and connecting a fixation lug 37 of support arm 1 to brake plate 35. To allow the passage, the installation and the removal of driving chain 38 of rear wheel 2 connecting a transmission output sprocket or pinion 39 to driving wheel 40 of wheel 2, the various levers, push-rods and links that have been described herein-above are laterally disposed with respect to the general axis 32 of the support arm 1 and can, where necessary, be utilized in pairs on either side of the support arm.

The operating of the suspension device that has been described herein-above will now be explained. As may be seen on the FIGURE, shock-absorber body 12 is housed almost completely underneath the block 3 of the engine-transmission block, only the rotary sleeve 18 for the damping adjustment and the piston rod 22 extending beyond the vertical projection of block 3 to ensure the scissors connection between rods 26 and 27 and retaining-rod 34, on the one hand, the short arm 11 of the three-arm lever 5 disposed adjacent to the outlet of the shock-absorbing body 12 beyond the vertical projection of block 3. Suspension spring 21 which is relatively more bulky than shock-absorbing body 12 is, on the contrary, entirely housed underneath case 3 and is represented on the figure in shock position in terms of suspension displacement, i.e. in maximal compression position caused for example, by the passage of rear wheel 2 over a bump in the rolling path 19.

After the suspension shock, the reaction of spring 21 tends to return body 12 back toward the top engine-suspension block 3 constituting with the motorcycle driver himself the principal suspended weight of the motorcycle. To do this, push-rod 8 exerts a reaction force or rebounce force R (cf. arrow R on the figure) on extension 10 of arm 1 that tends to turn clock-wise around its connecting axle 4 to case 3. Axle 6 being integral with block 3, three-arm lever 5 turns counter clock-wise around axle 6 during rebounce rotation of extension 10, which provokes a slight displacement towards the right-hand side of the figure and thus towards axle 30 of the rear wheel, of support belt 15 of the suspension and shock-absorber block 13, due to the accompanying rotation of short arm 11 of lever 5. The rotation by the same angle of long arm 28 draws, on the contrary, push-rod 26 towards the left-hand side of the FIGURE by a much greater distance, and the connection of plate 25 to long push-rod 27 compels rod 22 to return inside shock-absorbing body 12 to compress suspension spring 21 that constitutes the engine of the "rebounce" rotation of arm 1.

During the return stroke of piston rod 22, shock-absorber piston 17 presents only a very constricted passage and calibrated at a high pressure in order to ensure the connection between its two faces and the hydraulic damping or shock-absorbing is maximal. After the dampened return of the suspension in rebounce position, spring 21, flange 20 and adjusting screw 16 occupy the free displacement space 41 provided underneath block 3 and at the following shock on wheel 2, support arm 1 can again turn in an a counter direction in order to bring the levers and suspension push-rods into shock position, as represented in the figure by causing piston rod 22 to emerge towards the outside. During the "shock" stroke of shock-absorber piston 17, i.e. its displacement towards the right hand side of the FIGURE, the constriction and the adjusted discharge pressure of the passage between the two faces of piston 17 are generally smaller than on rebounce thereby allowing improved adherence while further limiting striking risks of abutment 31 on shock-absorbing body 12.

The suspension design, i.e. relative respective lengths of the arms of lever 5, push-rods 8, 26 and 27 as well as their hinging positions and the position of axle 6 and of the axis of shock-absorber body 12 are preferably selected so that movable rod 22 remains substantially parallel, either to rolling path 19, or the general axis 32 of the suspension arm or, where necessary, occupies a medium position between these two last positions so that bearing flange 20a of spring 21 displaces over uniquely axial-wise inside of its housing 41 underneath block 3 and thus occupies minimal space during this displacement. Of course, it is possible to provide a suspension design in which push-rods 26 and 27, and where necessary rod 34, are connected to hinging connection 23 or to rod 22 by a common axis of hinging replacing articulation plate 25. The whole or a part of the suspension device can be covered by an aerodynamic or protection streamlining or fairing.

Brake rod 34 is subjected to axial efforts during braking in order to be opposed to braking moment on wheel 2 that tends to cause to turn brake plate 35 in anti-clockwise direction. Therefore, during braking on rear wheel 2, rod 34 undergoes a traction towards the right hand side of the FIGURE that tends to draw rod 22 towards the right also and to compress spring 21. This association of the suspension and the braking effects exerts a beneficial effect since it is partially opposed to the load-discharge of the rear wheel during braking which is apparent from a dipping of the front suspension called "bow" in motorcycling terms.

The suspension and shock-absorber device that has been described herein-above with application to a rear wheel of a motorcycle can also be applied to the front wheel of a motorcycle and a vehicle wheel generally supported by a rotary support arm. According to other embodiments, suspension and shock-absorber block 13 as well as push-rods and connecting rods can be disposed above support arm 1, suspension spring 21 being, for example, interposed between shock-absorber body 12 and hinging connection 23, piston rod of spring 20 thus being suppressed.

I claim:

1. A suspension and shock-absorbing device for a support arm of a wheel of a motorcycle, said support arm pivotally mounted at one end thereof to a connecting axle secured to a body of said motorcycle, said device comprising:
   a lever axle being secured to said body and being substantially parallel to said connecting axle;
   a three arm lever rotatably mounted on said lever axle, said three arm lever including a medium arm, a short arm substantially opposite the medium arm and a long arm directed toward the wheel of said motorcycle;
   said support arm including an extension adjacent said connecting axle;
   a short push-rod hingedly connecting said medium arm of said three arm lever to said extension;
   a spring suspension and damper unit having a movable rod in translation;
   said short arm of said three arm lever pivotally connected to said spring suspension and damper unit;
   a medium push-rod hingedly connecting the long arm of said three arm lever to the movable rod of said spring suspension and damper unit;
   a long push-rod pivotally connected at one end to said movable rod of said spring suspension and damper unit and at an opposite end to said support arm at a position adjacent said wheel so as to provide a scissor-like hanging of the spring suspension and damper unit with respect to the short arm of said three arm lever and to provide a pivotal connection of the movable rod to the medium and long push-rods.

2. A device according to claim 1, wherein the lengths of the arms of the three-arm lever, the position of the lever axle with respect to the connecting axle, and the lengths of the short, medium and long push-rods and the position of hinging axles thereof, are selected so that the movable rod of the spring suspension and damper unit remains substantially parallel to the rolling surface of the wheel during suspension displacement of the support arm.

3. A device according to claim 1, wherein said motorcycle includes an engine transmission block, and wherein the spring suspension and damper unit is principally housed underneath the engine transmission block, and the short arm of the three-arm lever is hinged to the engine transmission block and is connected to the spring suspension and damper unit in the vicinity of the hinged connection to the engine transmission block.

4. A device according to claim 1, wherein the medium push-rod and the long push-rod are hinged to the movable rod of the spring suspension and damper unit.

5. A device according to claim 1, further including a connecting piece fixedly connected with the movable rod, and wherein the medium push-rod and the long push-rod are hinged together to the movable rod of the spring suspension and damper unit by connecting piece.

6. A device according to claim 5, wherein said motorcycle includes a brake calliper bracket plate receiving a brake reaction torque of the wheel and intended to turn angularly around the axle of the wheel during displacement of the connecting piece and a retaining rod hinged at one end to said bracket plate, and wherein said connecting piece is hinged to an opposite end of said retaining rod.

7. A device according to claim 1, wherein, in a position of maximal extension of the movable rod with respect to the spring suspension and damper unit block, the long push-rod is inclined at an angle of essentially 45° with respect to the support arm.

* * * * *